(12) United States Patent
Kimura et al.

(10) Patent No.: US 8,012,361 B2
(45) Date of Patent: *Sep. 6, 2011

(54) METHOD OF MANUFACTURING MAGNETIC RECORDING MEDIUM

(75) Inventors: Kaori Kimura, Kawasaki (JP); Yousuke Isowaki, Yokohama (JP); Yoshiyuki Kamata, Tokyo (JP); Masatoshi Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/705,421

(22) Filed: Feb. 12, 2010

(65) Prior Publication Data

US 2010/0214694 A1 Aug. 26, 2010

(30) Foreign Application Priority Data

Feb. 20, 2009 (JP) ................................. 2009-038208

(51) Int. Cl.
*B44C 1/22* (2006.01)
(52) U.S. Cl. ................ 216/22; 216/40; 216/75; 438/754
(58) Field of Classification Search .............. 216/22, 216/40, 51, 67, 75; 438/736, 754, 785
See application file for complete search history.

(56) References Cited

U.S. PATENT DOCUMENTS

| | | | |
|---|---|---|---|
| 6,014,296 A | 1/2000 | Ichihara et al. | |
| 6,221,519 B1 | 4/2001 | Doi et al. | |
| 6,266,354 B1 | 7/2001 | Chino et al. | |
| 6,984,529 B2 * | 1/2006 | Stojakovic et al. | 438/3 |
| 7,067,207 B2 | 6/2006 | Kamata et al. | |
| 7,100,263 B2 * | 9/2006 | Imada et al. | 29/514 |
| 2001/0055852 A1 | 12/2001 | Moise et al. | |
| 2002/0090827 A1 | 7/2002 | Yokoshima | |
| 2004/0020894 A1 | 2/2004 | Williams et al. | |
| 2004/0253817 A1 | 12/2004 | Imada et al. | |
| 2005/0000934 A1 | 1/2005 | Nakatani et al. | |
| 2005/0243467 A1 | 11/2005 | Takai et al. | |
| 2005/0284842 A1 | 12/2005 | Okawa et al. | |

(Continued)

FOREIGN PATENT DOCUMENTS

JP 02-207418 8/1990

(Continued)

OTHER PUBLICATIONS

Explanation of Non-English Language Reference(s).

(Continued)

*Primary Examiner* — Lan Vinh
(74) *Attorney, Agent, or Firm* — Knobbe Martens Olson & Bear, LLP

(57) ABSTRACT

According to one embodiment, a method of manufacturing a magnetic recording medium includes forming a first hard mask, a second hard mask and a resist on a magnetic recording layer, imprinting a stamper to the resist to transfer patterns of protrusions and recesses to the resist, removing residues remaining in the recesses of the patterned resist, etching the second hard mask by using the patterned resist as a mask to transfer the patterns of protrusions and recesses to the second hard mask, etching the first hard mask by using the second hard mask as a mask to transfer the patterns of protrusions and recesses to the first hard mask, removing the second hard mask remaining on the protrusions of the first hard mask, and deactivating the magnetic recording layer exposed in the recesses by means of ion beam irradiation.

12 Claims, 5 Drawing Sheets

U.S. PATENT DOCUMENTS

| | | | |
|---|---|---|---|
| 2006/0003551 A1* | 1/2006 | Mancini et al. | 438/462 |
| 2006/0021966 A1 | 2/2006 | Hattori et al. | |
| 2006/0124585 A1 | 6/2006 | Suwa et al. | |
| 2006/0183004 A1 | 8/2006 | Hattori et al. | |
| 2006/0222897 A1 | 10/2006 | Kamata et al. | |
| 2006/0222899 A1 | 10/2006 | Sugimura et al. | |
| 2007/0059562 A1 | 3/2007 | Hattori et al. | |
| 2007/0070547 A1 | 3/2007 | Kamata et al. | |
| 2007/0211592 A1* | 9/2007 | Sakurai et al. | 369/47.49 |
| 2007/0224339 A1 | 9/2007 | Kamata et al. | |
| 2007/0263324 A1 | 11/2007 | Allen et al. | |
| 2007/0281078 A1 | 12/2007 | Kikitsu et al. | |
| 2008/0075845 A1 | 3/2008 | Sonobe et al. | |
| 2008/0078739 A1 | 4/2008 | Hibi et al. | |
| 2008/0093336 A1 | 4/2008 | Lee et al. | |
| 2008/0158718 A1 | 7/2008 | Kobayashi et al. | |
| 2008/0174914 A1 | 7/2008 | Takai et al. | |
| 2008/0217615 A1 | 9/2008 | Kerber | |
| 2009/0023078 A1 | 1/2009 | Gutmann et al. | |
| 2009/0305081 A1 | 12/2009 | Dai et al. | |
| 2009/0308837 A1 | 12/2009 | Albrecht et al. | |
| 2009/0314740 A1 | 12/2009 | Ikemoto et al. | |
| 2010/0018946 A1 | 1/2010 | Isowaki et al. | |
| 2010/0018947 A1 | 1/2010 | Kimura et al. | |
| 2010/0047625 A1 | 2/2010 | Kamata et al. | |
| 2010/0053813 A1 | 3/2010 | Fukushima et al. | |
| 2010/0059476 A1 | 3/2010 | Yamamoto et al. | |
| 2010/0147791 A1 | 6/2010 | Isowaki et al. | |
| 2010/0155231 A1 | 6/2010 | Watanabe et al. | |
| 2010/0214695 A1 | 8/2010 | Isowaki et al. | |
| 2010/0215989 A1 | 8/2010 | Isowaki et al. | |
| 2011/0000880 A1 | 1/2011 | Kamata et al. | |

FOREIGN PATENT DOCUMENTS

| | | |
|---|---|---|
| JP | 03-040219 | 2/1991 |
| JP | 05-205257 | 8/1993 |
| JP | 11-328652 | 11/1999 |
| JP | 2000-286241 | 10/2000 |
| JP | 2002-501300 | 1/2002 |
| JP | 2002-359138 | 12/2002 |
| JP | 2003-183859 | 7/2003 |
| JP | 2004-164692 | 6/2004 |
| JP | 2005-042143 | 2/2005 |
| JP | 2005-050468 | 2/2005 |
| JP | 2005-056535 | 3/2005 |
| JP | 2005-070650 | 3/2005 |
| JP | 2005-071542 | 3/2005 |
| JP | 2005-317155 | 11/2005 |
| JP | 2006-012332 | 1/2006 |
| JP | 2006-147148 | 6/2006 |
| JP | 2006-196143 | 7/2006 |
| JP | 2007-087053 | 4/2007 |
| JP | 2007-095115 | 4/2007 |
| JP | 2008-065944 | 3/2008 |
| JP | 2008-135092 | 6/2008 |
| JP | 2008-135095 | 6/2008 |
| JP | 2008-210450 | 9/2008 |
| JP | 2009-076924 | 4/2009 |
| JP | 2009-170007 | 7/2009 |
| JP | 2009-181674 | 8/2009 |
| JP | 2009-301655 | 12/2009 |
| JP | 2010-033636 | 2/2010 |
| WO | WO 99/35657 | 7/1999 |
| WO | WO 2008/069082 A1 | 6/2008 |

OTHER PUBLICATIONS

Translation of the Notice of Reasons for Rejection mailed by JPO on Oct. 13, 2009 for Japanese Patent Application No. 2008-192537 (corresponding to U.S. Appl. No. 12/508,269).

Translation of the Notice of Reasons for Rejection mailed by JPO on Mar. 9, 2010 for Japanese Patent Application No. 2008-317382 (corresponding to U.S. Appl. No. 12/636,610).

Translation of the Notice of Reasons for Rejection mailed by JPO on Nov. 17, 2009 for Japanese Patent Application No. 2008-213674 (corresponding to U.S. Appl. No. 12/544,606).

Translation of the Notice of Reasons for Rejection mailed by JPO on Oct. 13, 2010 for Japanese Patent Application No. 2008-192536 (corresponding to U.S. Appl. No. 12/509,261).

Translation of the Notice of Reasons for Rejection mailed by JPO on Feb. 2, 2010 for Japanese Patent Application No. 2008-192536 (corresponding to U.S. Appl. No. 12/509,261).

Translation of the Notice of Reasons for Rejection mailed by JPO on Apr. 20, 2010 for Japanese Patent Application No. 2009-038207 (corresponding to U.S. Appl. No. 12/705,456).

Translation of the Notice of Reasons for Rejection mailed by JPO on Apr. 20, 2010 for Japanese Patent Application No. 2009-038206 (corresponding to U.S. Appl. No. 12/705,490).

Translation of the Notice of Reasons for Rejection mailed by JPO on Apr. 20, 2010 for Japanese Patent Application No. 2009-038208 (corresponding to U.S. Appl. No. 12/705,421).

* cited by examiner

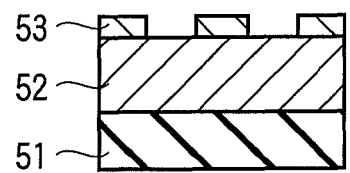
F I G. 4A
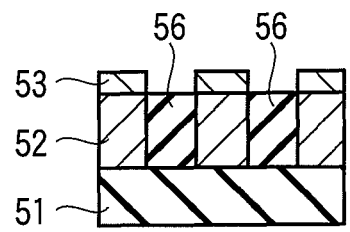
F I G. 4B
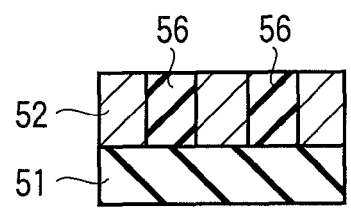
F I G. 4C
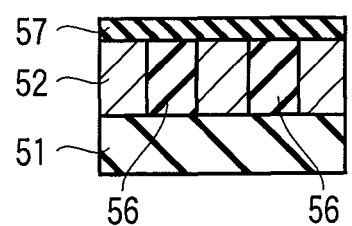
F I G. 4D

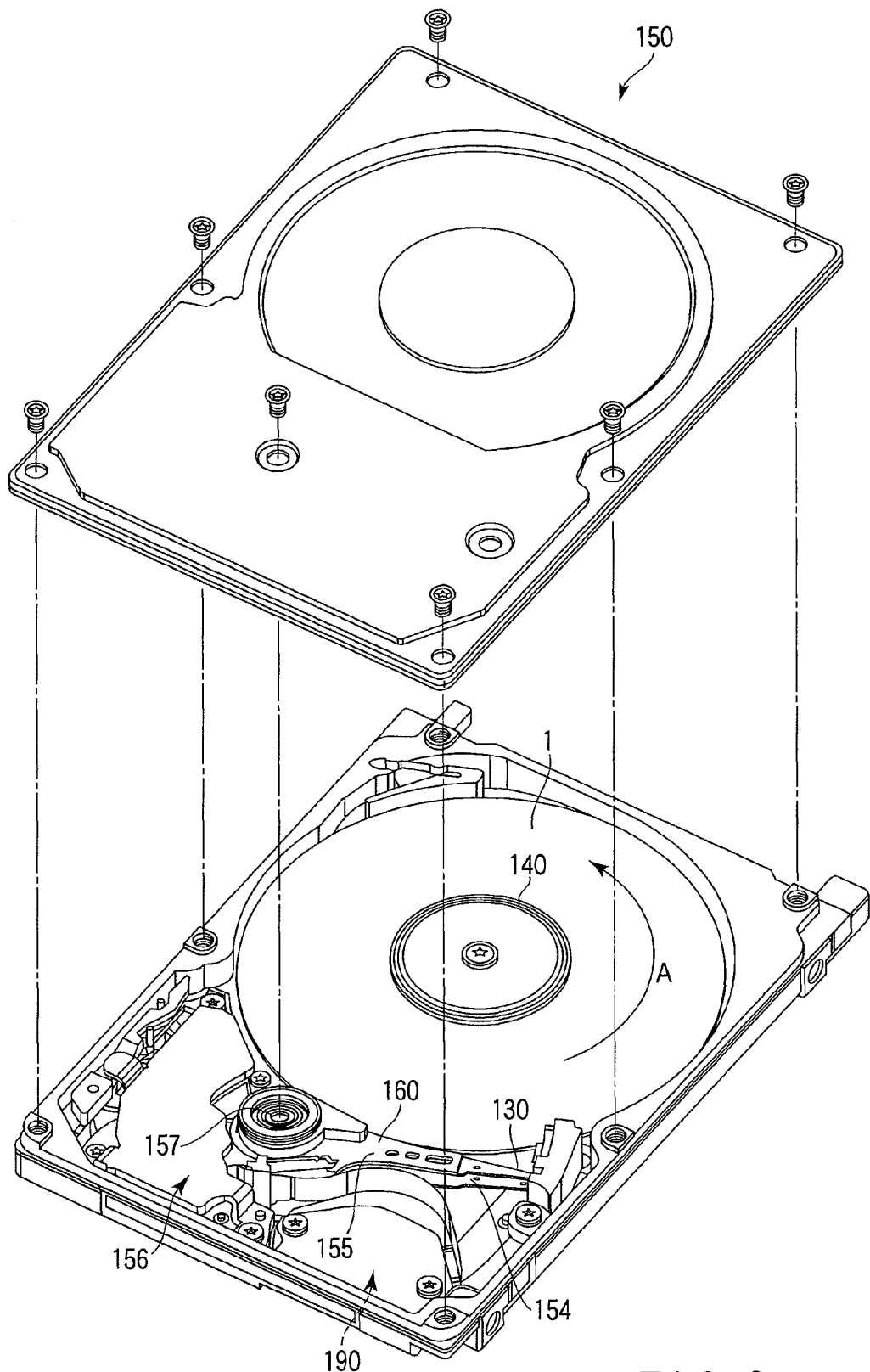
F I G. 6

METHOD OF MANUFACTURING MAGNETIC RECORDING MEDIUM

CROSS-REFERENCE TO RELATED APPLICATIONS

This application is based upon and claims the benefit of priority from Japanese Patent Application No. 2009-038208, filed Feb. 20, 2009, the entire contents of which are incorporated herein by reference.

BACKGROUND

1. Field

One embodiment of the present invention relates to a method of manufacturing a magnetic recording medium such as a patterned medium.

2. Description of the Related Art

In the information-oriented society in recent years, the amount of data to be stored in a recording medium is continually increasing. For this reason, a recording apparatus and a recording medium with an outstandingly high recording capacity have been desired. Also, hard disks, which are currently in an increasing demand as an economical recording medium of high capacity, are expected to be required to have a recording density of 1 tera-bit or more per square inch, which is ten times the current density, in coming years.

In a magnetic recording medium used in conventional hard disks, a predetermined region of a thin film including polycrystals of magnetic fine particles is used as one bit for recording. In order to increase recording capacity of a magnetic recording medium, the recording density should be increased. In other words, it is necessary to reduce the recording mark size which is usable for recording of one bit. However, when the recording mark size is simply reduced, the influence of noise which depends on the shapes of magnetic fine particles becomes nonnegligible. If the particle size of magnetic fine particles is reduced to lower the noise, a problem of thermal fluctuation occurs, which makes it impossible to maintain recorded data at a room temperature.

In order to avoid these problems, a bit patterned medium (BPM) has been proposed, in which the recording material is separated by a nonmagnetic material in advance, and a single magnetic dot is used as a single recording cell to perform read and write.

In magnetic recording media installed in HDDs, there is an arising problem of the interference between adjacent tracks which inhibits improvement in track density. Particularly, reducing a fringe effect of a write head field is a significant technical problem to be solved. To solve this problem, there has been developed a discrete track recording-type patterned medium (DTR medium), in which the magnetic recording layer is processed so that the recording tracks are physically separated from each other. In the DTR medium, it is possible to reduce side erase which erases information in the adjacent tracks in writing and side read which reads information in the adjacent tracks in reading. On this account, the DTR medium is promising as a magnetic recording medium capable of providing a high recording density. Incidentally, it should be noted that the term "patterned medium" as used herein in a broad sense includes the bit patterned medium and DTR medium.

In the manufacture of a patterned medium (DTR medium, or BPM), it is an extremely significant problem to reduce irregularity on the surface of the medium, from the viewpoint of flying property of the head. In an ordinary patterned medium, magnetism is separated by using a method such as etching to physically separate the magnetic recording layer. However, if a magnetic recording layer having a thickness of several tens of nanometers is completely etched, the flying property of the head is deteriorated, and as a result, the HDD does not properly function. To overcome this problem, a method of filling recesses is well known. Also effective is a method of deactivating recessed regions as we suggest. In this method, regions of the magnetic recording layer corresponding to the non-recording regions in a patterned medium are deactivated to lose the magnetism thereof, and as a result, a separating effect can be obtained without physically separating the magnetic recording layer.

In patterned media, imprint lithography technique is used to form patterns on the medium. The problem in this case is etching selectivity of the imprinting material to the medium to be patterned. Materials which contain carbon as a main component are preferably used for a mask for the deactivation or the separation of the magnetic recording layer. However, since many imprinting materials show difficulty in having appropriate selectivity to carbon, it is difficult to produce patterns with a good rectangular shape by simply applying the imprinting material on carbon. To solve this problem, Jpn. Pat. Appln. KOKAI Publication Nos. 2005-50468 and 2006-12332 disclose a method in which carbon is used to form a first hard mask, and on the first hard mask, a material having a greater etching resistance than carbon is deposited as a second hard mask, to obtain a two-layered mask. However, most of the materials used as the second hard mask are modified in the process of deactivation, and often remain as residues after removal of the first hard mask, which causes roughness to the surface of the medium.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 4A to 4D are sectional views showing a part of the method of manufacturing a magnetic recording medium according to the present invention;

FIG. 6 is a perspective view of a magnetic recording apparatus in which a magnetic recording medium manufactured by the present invention is installed.

DETAILED DESCRIPTION

Various embodiments according to the invention will be described hereinafter with reference to the accompanying drawings. In general, according to one embodiment of the invention, there is provided a method of manufacturing a magnetic recording medium, comprising: forming a first hard mask, a second hard mask and a resist on a magnetic recording layer; imprinting a stamper to the resist to transfer patterns of protrusions and recesses to the resist; removing residues remaining in the recesses of the patterned resist; etching the second hard mask by using the patterned resist as a mask to transfer the patterns of protrusions and recesses to the second hard mask; etching the first hard mask by using the second hard mask as a mask to transfer the patterns of protrusions and recesses to the first hard mask; removing the second hard mask remaining on the protrusions of the first hard mask; and deactivating the magnetic recording layer exposed in the recesses by means of ion beam irradiation.

Figure 1:
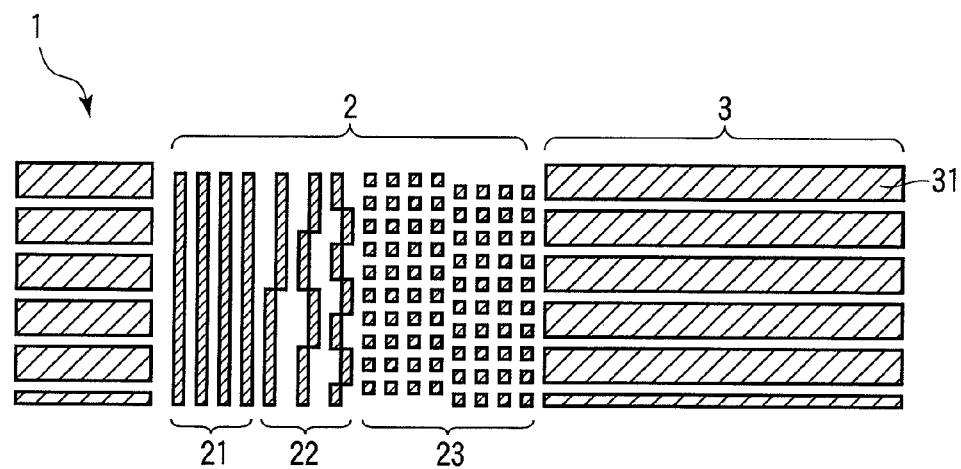
FIG. 1 is a plane view of a discrete track medium (DTR medium) manufactured by the method of the present invention along the circumferential direction.

FIG. 1 shows a plane view of a discrete track recording medium (DTR medium) which is an example of the patterned medium manufactured by the method of the present invention along the circumferential direction. As shown in FIG. 1, servo regions 2 and data regions 3 are alternately formed along the circumferential direction of a patterned medium 1. The servo region 2 includes a preamble section 21, an address section 22 and a burst section 23. The data region 3 includes discrete tracks 31 wherein adjacent tracks are separated from each other.

Figure 2:
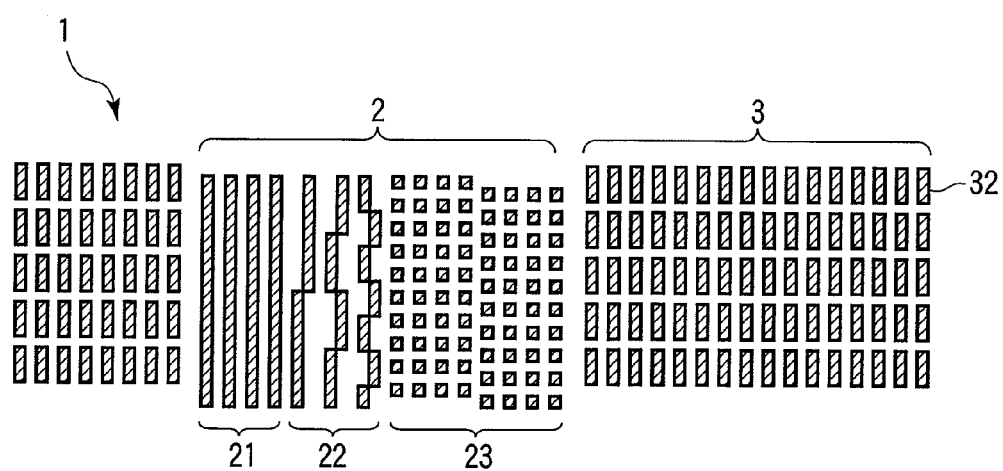
FIG. 2 is a plane view of a bit patterned medium manufactured by the method of the present invention along the circumferential direction.

FIG. 2 shows a plane view of a bit patterned medium (BPM medium) which is another example of the patterned medium manufactured by the method of the present invention along the circumferential direction. In this patterned medium, magnetic dots 32 are formed in the data region 3.

An example of the method of manufacturing a magnetic recording medium according to the present invention is explained hereinafter with reference to FIGS. 3A to 3I.

Figure 3A:
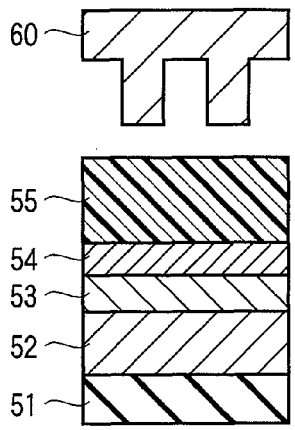
FIGS. 3A to 3I are sectional views showing an example of the method of manufacturing a magnetic recording medium according to the present invention.

As shown in FIG. 3A, on a glass substrate 51, a soft magnetic layer (CoZrNb) with a thickness of 40 nm (not shown), an underlayer (Ru) for orientation control with a thickness of 20 nm (not shown) and a magnetic recording layer 52 (CoCrPt—$SiO_2$) with a thickness of 20 nm are deposited. On the magnetic recording layer 52, a first hard mask 53 made of carbon with a thickness of 25 nm and a second hard mask 54 made of Cu with a thickness of 3 nm are deposited. A resist 55 is spin-coated on the second hard mask 54 to provide a thickness of 50 nm. On the other hand, a stamper 60 on which predetermined patterns of protrusions and recesses corresponding to the patterns shown in FIG. 1 or 2, for example, are formed is prepared. The stamper 60 is manufactured through processes of electron beam lithography, Nickel electroforming and injection molding. The stamper 60 is disposed so that the surface having the protrusions and recesses faces the resist 55.

Figure 3B:
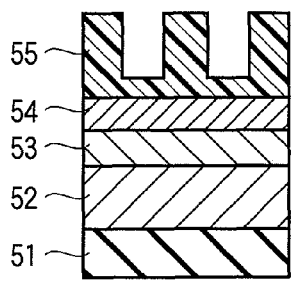

As shown in FIG. 3B, the resist 55 is imprinted with the stamper 60 to transfer the patterns of protrusions and recesses of the stamper 60 to the resist 55. After that, the stamper 60 is removed. Resist residues are left in the bottoms of the recesses of the patterns of protrusions and recesses transferred to the resist 55.

Figure 3C:
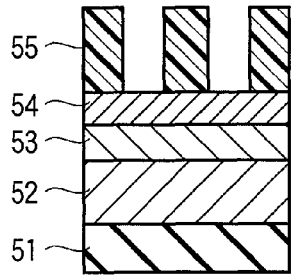

As shown in FIG. 3C, the resist residues in the recesses are removed by dry etching so that the surface of the second hard mask 54 is exposed. This step is performed, for example, by means of an ICP-RIE system, using $O_2$ as a process gas, with a chamber pressure set to 0.1 Pa, an RF power of a coil and an RF power of a platen set to 100 W and 50 W, respectively, and an etching time set to 15 seconds.

Figure 3D:
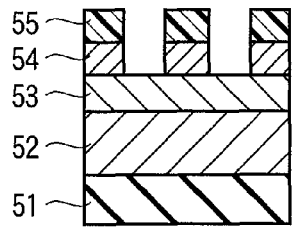

As shown in FIG. 3D, the patterns are transferred to the second hard mask 54 by using the patterned resist 55 as a mask, by means of ion beam etching so that the first hard mask 53 is exposed at the recesses. This step is performed, for example, by use of an ECR (electron cyclotron resonance) ion gun, using Ar as a process gas, with a microwave power of 500 W, an acceleration voltage of 600 V and an etching time of 10 seconds. By the process, a part of the second hard mask 54 made of Cu with a thickness of 3 nm is selectively etched over the entire thickness.

Figure 3E:
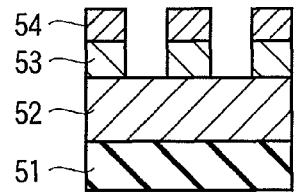

As shown in FIG. 3E, using the patterned second hard mask 54 as a mask, the first hard mask 53 made of carbon is etched to transfer the patterns so that the surface of the magnetic recording layer 52 is exposed at the recesses. This step is performed, for example, by use of an RIE system, using $O_2$ gas, with a gas pressure set to 0.1 Pa, an RF power of a coil and an RF power of a platen set to 100 W and 50 W, respectively, and an etching time set to 30 seconds. At this time, the remaining resist 55 is also stripped off.

Figure 3F:
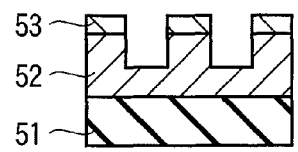

As shown in FIG. 3F, the remaining second hard mask (Cu) 54 is removed. This step is performed, for example, by use of an ECR (electron cyclotron resonance) ion gun, using Ar as a process gas, with a microwave power of 500 W, an acceleration voltage of 600 V, and an etching time of 20 seconds, and the remaining second hard mask 54 is entirely removed.

Figure 3G:
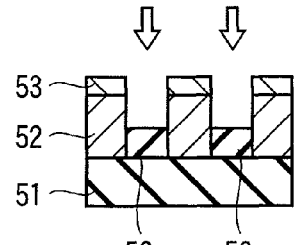

As shown in FIG. 3G, the magnetic recording layer 52 is deactivated at the regions of recesses to form a nonmagnetic layer 56. In this case, by use of a deactivating gas, a crystal structure of the magnetic recording layer 52 is changed to amorphous phase to perform the deactivation. This step is performed, for example, by use of an ECR ion gun, using a mixture gas of He—$N_2$ at a flow-ratio of 1:1, with a gas pressure of 0.02 Pa, a microwave power of 1000 W, an acceleration voltage of 1000 V, and a processing time of 200 seconds.

Figure 3H:
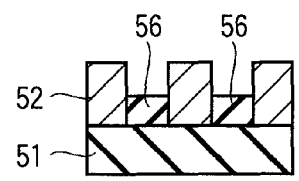

As shown in FIG. 3H, the remaining first hard mask (carbon) 53 is removed. This step is performed, for example, by use of an RIE system, using $O_2$ gas, with a gas pressure set to 1.5 Pa, an RF power of a coil and an RF power of a platen set to 400 W and 0 W, respectively, and an etching time set to 20 seconds.

Figure 3I:
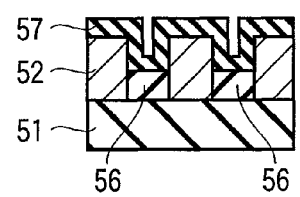

As shown in FIG. 3I, a protective film 57 is formed by CUP (chemical vapor deposition), and a lubricant is applied thereto to provide a patterned medium of the present invention.

The method of manufacture according to the present invention is not limited to the method shown in FIGS. 3A-3I, but may include a step in which a part of the magnetic recording layer 52 is etched by using the first hard mask 53 as a mask (FIG. 5G), prior to the step of deactivating the magnetic recording layer 52 (FIG. 5H) as shown in FIGS. 5A-5J. Such a step is performed for the purpose of shortening the time for the subsequent process of deactivation if desired.

Incidentally, in the above processes, the thickness of various types of films and the depth of the recesses can easily be measured using, for example, AFM (atomic force microscope), cross-sectional TEM (transmission electron microscope) or the like. Also, the type of metal mask and its composition ratio can easily be determined by EDX (energy dispersive X-ray spectroscopy) analysis. It is also possible to investigate the type of etching gas used in the ion beam etching and its effect by subjecting the finished medium to XPS (X-ray photoelectron spectroscopy) analysis to analyze the remaining gas within the medium.

Figure 5A:
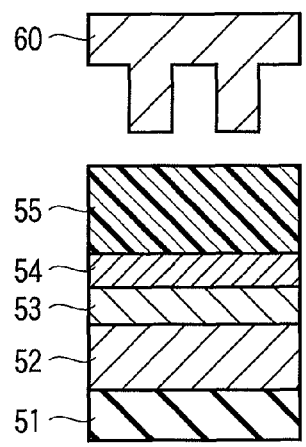
FIGS. 5A to 5J are sectional views showing another example of the method of manufacturing a magnetic recording medium according to the present invention.
Figure 5B:
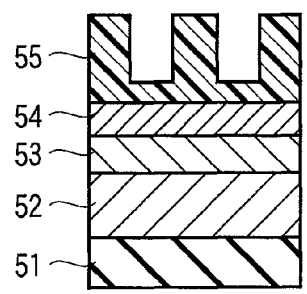
Figure 5C:
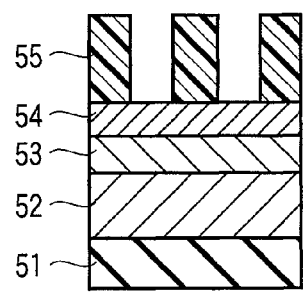
Figure 5D:
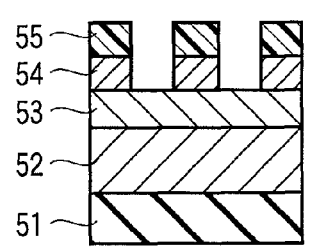
Figure 5E:
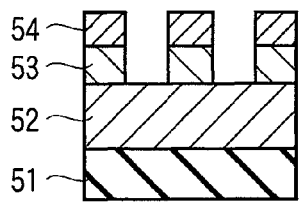
Figure 5F:
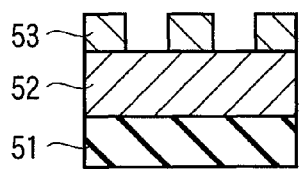

Hereinafter, the step shown in FIG. 3F, 4A or 5F is explained in more detail. In the method of the present invention, the second hard mask 54 is removed prior to the step of deactivation.

In contrast, in conventional methods, the removal of the second hard mask 54 is performed in parallel with the deactivation of the magnetic recording layer 52 at the recesses, under an etching condition optimized for deactivation. In such a method, the second hard mask 54 is often modified depending on conditions of deactivation, and the modified second hard mask 54 remains as residues on surfaces of the protrusions of the magnetic recording layer 52, even after the removal of the first hard mask 53. As a result, the surface of the resultant magnetic recording medium loses smoothness to deteriorate the flying stability of the head. In this connection, being studied is a method to recover the smoothness of the surface which incorporates a step to remove the residues in the last stage of the method of manufacture, especially just before the deposition of diamond-like carbon. However, the removal of the residues takes a long time, resulting in a damage to the magnetic recording layer 52, and consequently, performance of the magnetic recording medium is rather lowered in some cases.

In the method of the present invention, the step of removing the second hard mask 54 is employed independently from the step of deactivation, and therefore, the second hard mask 54 is removed without being modified. As a result, after the removal of the first hard mask 53, residues derived from the second hard mask 54 hardly remain on the surface of the protrusions of the magnetic recording layer 52, and therefore the smoothness of the surface of the magnetic recording layer 52 is maintained. Moreover, since it is not necessary to employ a step to remove the residues in the last stage of the method of manufacture, the resulting damage to the magnetic recording layer 52 does not occur.

By the step of removing the second hard mask 54 in the present invention, a part of or the entire second hard mask 54 remaining on the surface of the protrusions of the first hard mask 53 is removed. The term "a part" is removed as used herein means that the second hard mask 54 is removed leaving a "mixing" region. When the first hard mask 53 and the second hard mask 54 are processed through the step of layer deposition or a plurality of etching steps, the elements of both of the masks are mixed at the interface between the first hard mask 53 and the second hard mask 54. This is referred to as mixing. In the method of the present invention, the pure second hard mask 54 is entirely removed regardless of whether a case involves mixing or not. In this connection, the term "stripping off" of the second hard mask 54 refers to the same meaning as the term "removing".

The composition of the first hard mask in the method of the present invention is made from carbon as the main raw material. The proportion of carbon is desirably more than 75% in terms of atom number ratio. When the proportion of carbon is 75% or less, the etching selectivity is decreased, which results in a tendency that a magnetic layer cannot be processed into a good shape. The first hard mask can be deposited by sputtering or CVD. The thickness of the first hard mask is preferably 4 to 50 nm. If the thickness is too thick, etching takes a long time when it is stripped off, resulting in damage to sidewalls of patterned film. If the thickness is too thin, it cannot function as a hard mask for etching. If necessary, an antioxidant layer may be deposited between the first hard mask and the magnetic recording layer.

The second hard mask 54 in the method of the present invention desirably has resistance to $O_2$ or $O_3$ gas, and desirably comprises Al, Si, Ta or Ti, or, Ag, Au, Co, Cr, Cu, Ni, Pd or Pt as a main component. For example, these elements can be used as a simple substance; or nitride, oxide, alloy and mixture of these elements can be used. Additionally, the thickness of the second hard mask 54 is preferably 1 to 15 nm, and particularly 3 nm is preferable. If the thickness is too thick, it causes damage to the magnetic recording layer in removal of the second hard mask 54. In contrast, if the thickness is too thin, it cannot be deposited to make a uniform film, and therefore the first hard mask 53 cannot be formed.

With regard to the conditions of the removal of the second hard mask 54 in the method of the present invention, the same RIE system as used in the patterning of the second hard mask 54 may be used, and alternatively, ion beam etching using Ar, Kr, or Xe may be used. For example, when the material of the second hard mask 54 is Al, Si, Ta or Ti, it is preferable to use a gas comprising fluorine, especially $CF_4$. On the other hand, when the material of the second hard mask 54 is Ag, Au, Co, Cr, Cu, Ni, Pd or Pt, preferably used is ion beam etching using a gas comprising Ne, Ar, Kr or Xe, or a gas comprising $O_2$ or $N_2$, particularly ion beam etching using Ar.

In the method of the present invention, a step of deactivating the magnetic recording layer 52 (FIGS. 3G and 4B) is employed after the step of removing the second hard mask 54. By deactivating the magnetic recording layer 52 in the recessed regions, the magnetic recording medium is improved in fringe property. As used herein, the term deactivation refers to a step to weaken the magnetism at the recesses in comparison with the magnetism at the protrusions in the patterned magnetic recording layer 52; and weakening the magnetism refers to rendering the layer soft magnetic, nonmagnetic or diamagnetic. These changes in the magnetism can be observed by measuring the values of Hn, Hs and Hc, by means of a vibrating sample magnetometer (VSM) or magnetooptic Kerr effect measurement system.

In the method of the present invention, the step of deactivation may be performed by use of a gas or a solution. In the case of using a gas, a reactive gas of $CF_4$, $SF_6$, $CHF_3$, $O_2$, $O_3$, $N_2$, $Cl_2$, or $H_2$; a rare gas of He, Ne, Ar, Kr, or Xe; or a mixture gas thereof may be used. In the case of using a fluorine-containing gas, a step to remove the reactant product of fluorine and Co contained in magnetic recording layer 52 may be employed. In that case, preferable means for the removal is water washing or irradiation of water vapor plasma, $H_2$ plasma, or the like. In the case of using a rare gas such as He, Ne, Ar, Kr and Xe, it is ionized by ECR, and irradiated with an high acceleration energy. By this step, it is possible to destroy the crystal structure of the magnetic recording layer to lose the magnetism. In the case of using $O_2$ or $N_2$, O atom or N atom is penetrated into the crystal structure to form a compound. It is also possible to use rare gas of He or Ar and a reactive gas of $N_2$ or $O_2$ in combination, which is very preferable to inactivate the magnetism, since effects of the both types of gas can be obtained. In particular, it is preferable to use a mixture gas of He and $N_2$. In a case where $N_2$ or $O_2$ gas is used, it is preferable to deposit the first hard mask thicker, since the first hard mask is simultaneously etched. In a case where the step of deactivation is performed by use of a solution, that is, using a wet-etching method, an acid such as hydrofluoric acid, hydrochloric acid, nitric acid, and sulfamic acid is used.

In the method of the present invention, it is also possible to employ a step where a part of the magnetic recording layer 52 is etched by using the first hard mask 53 as a mask (FIG. 5G), prior to the step of deactivation (FIG. 5H), as the example of method of manufacture shown in FIGS. 5A-5J. This step is preferably performed by means of etching which uses an ion beam of He, Ne, Ar, Kr, or Xe (especially, Ar gas is preferably used); by means of ion beam irradiation by ECR (electron cyclotron resonance) using Ar gas (or $O_2$ gas or $N_2$ gas); or it is also possible to use RIE which uses a Cl2 gas, a mixture gas of CO and $NH_3$ or methanol. The depth of processing is made shallow in the direction of the thickness of the magnetic recording layer to leave a part of the magnetic recording layer. By employing such a step of etching the magnetic recording layer 52, it is possible to shorten the time of the subsequent process of deactivating.

Hereinafter, preferable materials to be used in the embodiments of the present invention other than the materials described above will be described.

<Substrate>

As the substrate, for example, a glass substrate, an Al-based alloy substrate, a ceramic substrate, a carbon substrate or an Si single crystal substrate having an oxide surface may be used. As the glass substrate, an amorphous glass and a crystallized glass are used. Examples of the amorphous glass may include a general-purpose soda lime glass and an alumino-silicate glass. As the crystallized glass, a lithium-based crystallized glass may be exemplified. Examples of the ceramic substrate may include a sintered material containing, as a major component, a general-purpose aluminum oxide, an aluminum nitride, silicon nitride or the like, and fiber-reinforced materials thereof. As the substrate, it is also possible to use the above-described metal substrates or nonmetal substrates with a NiP layer formed thereon by plating or sputtering. Additionally, the methods of forming a thin film on the substrate are not limited to sputtering, but may include vacuum evaporation or electrolytic plating which can obtain the same effect.

<Soft Magnetic Underlayer>

The soft magnetic underlayer (SUL) serves a part of such a function of a magnetic head as to pass a recording magnetic field from a single-pole head for magnetizing a perpendicular magnetic recording layer in a horizontal direction and to circulate the magnetic field to the side of the magnetic head, and applies a sharp and sufficient perpendicular magnetic field to the recording layer, thereby improving read/write efficiency. For the soft magnetic underlayer, a material containing Fe, Ni or Co may be used. Examples of such a material may include FeCo-based alloys such as FeCo and FeCoV, FeNi-based alloys such as FeNi, FeNiMo, FeNiCr and FeNiSi, FeAl-based alloys and FeSi-based alloys such as FeAl, FeAlSi, FeAlSiCr, FeAlSiTiRu and FeAlO, FeTa-based alloys such as FeTa, FeTaC and FeTaN and FeZr-based alloys such as FeZrN. Materials having a microcrystalline structure such as FeAlO, FeMgO, FeTaN and FeZrN containing Fe in an amount of 60 at % or more or a granular structure in which fine crystal grains are dispersed in a matrix may also be used. As other materials to be used for the soft magnetic underlayer, Co alloys containing Co and at least one of Zr, Hf, Nb, Ta, Ti and Y may also be used. Such a Co alloy preferably contains 80 at % or more of Co. In the case of such a Co alloy, an amorphous layer is easily formed when it is deposited by sputtering. Because the amorphous soft magnetic material is not provided with crystalline anisotropy, crystal defects and grain boundaries, it exhibits excellent soft magnetism and is capable of reducing medium noise. Preferable examples of the amorphous soft magnetic material may include CoZr-, CoZrNb- and CoZrTa-based alloys.

An underlayer may further be formed beneath the soft magnetic underlayer to improve the crystallinity of the soft magnetic underlayer or to improve the adhesion of the soft magnetic underlayer to the substrate. As the material of such an underlayer, Ti, Ta, W, Cr, Pt, alloys containing these metals or oxides or nitrides of these metals may be used. An intermediate layer made of a nonmagnetic material may be formed between the soft magnetic underlayer and the recording layer. The intermediate layer has two functions including the function to cut the exchange coupling interaction between the soft magnetic underlayer and the recording layer and the function to control the crystallinity of the recording layer. As the material for the intermediate layer Ru, Pt, Pd, W, Ti, Ta, Cr, Si, alloys containing these metals or oxides or nitrides of these metals may be used.

In order to prevent spike noise, the soft magnetic underlayer may be divided into plural layers and Ru layers with a thickness of 0.5 to 1.5 nm are interposed therebetween to attain anti-ferromagnetic coupling. Also, a soft magnetic layer may be exchange-coupled with a pinning layer of a hard magnetic film such as CoCrPt, SmCo or FePt having longitudinal anisotropy or an anti-ferromagnetic film such as IrMn and PtMn. A magnetic film (such as Co) and a nonmagnetic film (such as Pt) may be provided under and on the Ru layer to control exchange coupling force.

<Magnetic Recording Layer>

For the perpendicular magnetic recording layer, a material containing Co as a main component, at least Pt and further an oxide is preferably used. The perpendicular magnetic recording layer may contain Cr if needed. As the oxide, silicon oxide or titanium oxide is particularly preferable. The perpendicular magnetic recording layer preferably has a structure in which magnetic grains, i.e., crystal grains having magnetism, are dispersed in the layer. The magnetic grains preferably have a columnar structure which penetrates the perpendicular magnetic recording layer in the thickness direction. The formation of such a structure improves the orientation and crystallinity of the magnetic grains of the perpendicular magnetic recording layer, with the result that a signal-to-noise ratio (SN ratio) suitable to high-density recording can be provided. The amount of the oxide to be contained is important to provide such a structure.

The content of the oxide in the perpendicular magnetic recording layer is preferably 3 mol % or more and 12 mol % or less and more preferably 5 mol % or more and 10 mol % or less based on the total amount of Co, Cr and Pt. The reason why the content of the oxide in the perpendicular magnetic recording layer is preferably in the above range is that, when the perpendicular magnetic recording layer is formed, the oxide precipitates around the magnetic grains, and can separate fine magnetic grains. If the oxide content exceeds the above range, the oxide remains in the magnetic grains and damages the orientation and crystallinity of the magnetic grains. Moreover, the oxide precipitates on the upper and lower parts of the magnetic grains, with an undesirable result that the columnar structure, in which the magnetic grains penetrate the perpendicular magnetic recording layer in the thickness direction, is not formed. The oxide content less than the above range is undesirable because the fine magnetic grains are insufficiently separated, resulting in increased noise when information is reproduced, and therefore, a signal-to-noise ratio (SN ratio) suitable to high-density recording is not provided.

The content of Cr in the perpendicular magnetic recording layer is preferably 0 at % or more and 16 at % or less and more preferably 10 at % or more and 14 at % or less. The reason why the content of the Cr is preferably in the above range is that the uniaxial crystal magnetic anisotropic constant Ku of the magnetic grains is not too much reduced and high magnetization is retained, with the result that read/write characteristics suitable to high-density recording and sufficient thermal fluctuation characteristics are provided. The Cr content exceeding the above range is undesirable because Ku of the magnetic grains is lowered, and therefore, the thermal fluctuation characteristics are degraded, and also, the crystallinity and orientation of the magnetic grains are impaired, resulting in deterioration in read/write characteristics.

The content of Pt in the perpendicular magnetic recording layer is preferably 10 at % or more and 25 at % or less. The reason why the content of Pt is preferably in the above range is that the Ku value required for the perpendicular magnetic layer is provided, and further, the crystallinity and orientation of the magnetic grains are improved, with the result that the thermal fluctuation characteristics and read/write characteristics suitable to high-density recording are provided. The Pt content exceeding the above range is undesirable because a layer having an fcc structure is formed in the magnetic grains and there is a risk that the crystallinity and orientation are impaired. The Pt content less than the above range is undesirable because a Ku value satisfactory for the thermal fluctuation characteristics suitable to high-density recording is not provided.

The perpendicular magnetic recording layer may contain one or more types of elements selected from B, Ta, Mo, Cu, Nd, W, Nb, Sm, Tb, Ru and Re besides Co, Cr, Pt and the oxides. When the above elements are contained, formation of fine magnetic grains is promoted or the crystallinity and orientation can be improved and read/write characteristics and thermal fluctuation characteristics suitable to high-density recording can be provided. The total content of the above elements is preferably 8 at % or less. The content exceeding 8 at % is undesirable because phases other than the hcp phase are formed in the magnetic grains and the crystallinity and orientation of the magnetic grains are disturbed, with the result that read/write characteristics and thermal fluctuation characteristics suitable to high-density recording are not provided.

As the perpendicular magnetic recording layer, a CoPt-based alloy, CoCr-based alloy, CoPtCr-based alloy, CoPtO, CoPtCrO, CoPtSi, CoPtCrSi, a multilayer structure of an alloy layer containing at least one type selected from the group consisting of Pt, Pd, Rh and Ru and a Co layer, and materials obtained by adding Cr, B or O to these layers, for example, CoCr/PtCr, CoB/PdB and CoO/RhO may be used.

The thickness of the perpendicular magnetic recording layer is preferably 5 to 60 nm and more preferably 10 to 40 nm. When the thickness is in this range, a magnetic recording apparatus suitable to higher recording density can be manufactured. If the thickness of the perpendicular magnetic recording layer is less than 5 nm, read outputs are too low and noise components tend to be higher. If the thickness of the perpendicular magnetic recording layer exceeds 40 nm, read outputs are too high and the waveform tends to be distorted. The coercivity of the perpendicular magnetic recording layer is preferably 237000 A/m (3000 Oe) or more. If the coercivity is less than 237000 A/m (3000 Oe), thermal fluctuation resistance tends to be degraded. The perpendicular squareness of the perpendicular magnetic recording layer is preferably 0.8 or more. If the perpendicular squareness is less than 0.8, the thermal fluctuation resistance tends to be degraded.

<Protective Film>

The protective film is provided for the purpose of preventing corrosion of the perpendicular magnetic recording layer and also preventing the surface of a medium from being damaged when the magnetic head is brought into contact with the medium. Examples of the material of the protective film include those containing C, $SiO_2$ or $ZrO_2$. It is preferable to set the thickness of the protective film from 1 to 10 nm. Since such a thin protective film enables to reduce the spacing between the head and medium, it is suitable for high-density recording. Carbon may be classified into $sp^2$-bonded carbon (graphite) and $sp^3$-bonded carbon (diamond). Though $sp^3$-bonded carbon is superior in durability and corrosion resistance to graphite, it is inferior in surface smoothness to graphite because it is crystalline material. Usually, carbon is deposited by sputtering using a graphite target. In this method, amorphous carbon in which $sp^2$-bonded carbon and $sp^3$-bonded carbon are mixed is formed. Carbon in which the ratio of $sp^3$-bonded carbon is larger is called diamond-like carbon (DLC). DLC is superior in durability and corrosion resistance and also in surface smoothness because it is amorphous and therefore utilized as the surface protective film for magnetic recording media. The deposition of DLC by CVD (chemical vapor deposition) produces DLC through excitation and decomposition of raw gas in plasma and chemical reactions, and therefore, DLC richer in $sp^3$-bonded carbon can be formed by adjusting the conditions.

Hereinafter, preferable conditions of manufacture for each step in the embodiments of the present invention, other than the steps described above, will be described.

<Imprinting>

A resist is uniformly applied to the surface of a medium by spin-coating, dipping method, ink-jet method, or the like. As the resist, a general photosensitive resin, a thermoplastic resin or a thermosetting resin may be used. The resin may desirably be one which can be etched by RIE using a gas containing oxygen or fluorine.

As the stamper for imprinting, one which is made of a material such as quartz, resin, Si or Ni is used. When a stamper made of quartz or resin is used, it is preferable to use a photosensitive resin (photoresist) which is cured with ultraviolet rays. When the resist is made of a thermosetting resin or a thermoplastic resin, the stamper is preferably made of Si or Ni, in view of the heat or pressure applied thereto in imprinting.

The imprinting is performed, for example, by pressing the resist with a resin stamper on which patterns of recording tracks and servo information are formed with a pressure of 5 t for 60 seconds, and by irradiating the resist with ultraviolet ray for 10 seconds, to thereby transfer the patterns onto the resist. For the pressing, on the lower plate of a die set, laminated in order are: the stamper, the substrate, and the stamper. The resultant layers are sandwiched between the lower plate and the upper plate of the die set. The resist is applied on both sides of the substrate beforehand. The stamper and the substrate are disposed such that the surface of the stamper having the protrusions and recesses faces the resist-coated side of the substrate. The patterns of protrusions and recesses formed by the imprinting have a height of 40 to 50 nm, and resulting residues have a thickness of about 20 nm. If a fluorine-based peeling agent is applied to the stamper, the stamper can be peeled off from the resist satisfactorily.

<Removal of Residues>

Removal of resist residues left after the imprinting is performed by RIE (reactive ion etching). As the plasma source, ICP (inductively coupled plasma) capable of producing high-density plasma under a low pressure is preferable, but an ECR (electron cyclotron resonance) plasma or general parallel-plate RIE system may be used. When a photosensitive resin is used as the resist, $O_2$ gas, $CF_4$ gas, or a mixture gas of $O_2$ and $CF_4$ is used. When an Si-based material (SOG (Spin-On-Glass), for example) is used as the resist, RIE which uses fluorine-containing gas such as $CF_4$ or $SF_6$ is used. The removal of residues is finished at the point where the second hard mask under the resist is exposed.

<Patterning of the Second Hard Mask>

After the steps of imprinting and the removal of the resist residues, the second hard mask is patterned on the basis of the patterns imprinted on the resist. RIE may be used for the patterning of the second hard mask, and also ion beam etching using Ar, Kr or Xe may be used. For example, when the material of the second hard mask is Ar, Si, Ta or Ti, it is preferable to use a gas of $CF_4$ and the like. When the material of the second hard mask is Ag, Au, Co, Cr, Cu, Ni, Pd or Pt, preferably used is ion beam etching using Ar. The patterning of the second hard mask is finished at the point where the surface of the first hard mask is exposed.

<Patterning of the First Hard Mask>

Since the first hard mask contains carbon as a main raw material, the first hard mask has a low resistance to $O_2$ or $O_3$ gas, and a high etching rate. Therefore, by forming the second hard mask having resistance to $O_2$ or $O_3$ gas, it is possible to form a mask with a good rectangular shape. For the patterning of the first hard mask, RIE which uses a gas containing $O_2$ or $O_3$ is preferably used. In a case where the resist has a low resistance to $O_2$ or $O_3$ gas, the resist remaining on the protrusions of the second hard mask may be stripped off simultaneously with the patterning of the first hard mask. The patterning of the first hard mask is finished at the point where the surface of the magnetic recording layer in the recesses is exposed.

<Removal of Second Hard Mask and Step of Deactivating>

After the patterning of the first hard mask, the removal of the second hard mask is performed as described above. Even after that, a step of etching the magnetic recording layer is optionally conducted as described above. Subsequently, the step to deactivate the magnetic recording layer 52 is performed.

<Removal of First Hard Mask>

After the step of deactivation, the removal of the first hard mask is performed. The first hard mask can easily be stripped off by means of oxygen asking, ICP etching system, RIE system or the like. It is not preferable to take too long a time for the stripping relative to the thickness of the mask, because it would cause damage to the magnetic recording layer due to oxidation, and lower the signal-to-noise ratio (S/N). For the purpose of preventing this problem, an antioxidant layer may be provided between the first hard mask and the magnetic recording layer.

<Step of Filling the Recesses>

After the mask is stripped off, filling of the recesses may be performed using a nonmagnetic material. The filling is performed by depositing a nonmagnetic material by means of bias sputtering or ordinal sputtering. The nonmagnetic material may be selected from inorganic substances, metals, and an oxide or a nitride thereof such as Si, SiC, SiC-C, SiOC, SiON, $Si_3N_4$, Al, AlxOy, Ti, TiOx, Ru, Pd, NiNb, NiNbTi, NiTa, NiSi, Zr, ZrOx, W, Ta, Cr, CrN and CN as a simple substance or mixture thereof. The bias sputtering is a sputter depositing method with the substrate being applied with a bias voltage. In this method, it is easy to deposit a film at the same time as filling the recesses.

In a case where the filling was performed, an etch-back is performed until the carbon protective film on the magnetic recording layer or the magnetic recording layer is exposed. This etch-back process is preferably performed by means of ion milling, but in a case where silicon-based filler such as $SiO_2$ is used, it is also possible to perform the process by means of RIE which uses fluorine-containing gas. Etching using an ECR ion gun may be performed. By mixing $O_2$ into a gas for the etch-back, etch-back can be performed at the same time as flattening the surface.

<Deposition of Protective Film and Post-Treatment>

The carbon protective film may be deposited to obtain good coverage over the protrusions and recesses preferably by means of CVD, but it may be deposited also by means of sputtering or vacuum deposition. When CVD is used, a DLC film containing a large amount of $sp^3$ bonded carbon is formed. Thickness of 2 nm or less is not preferable because it results in an unsatisfactory coverage. On the other hand, thickness of 10 nm or more is not preferable because it increases magnetic spacing between the read/write head and the medium to lower SNR. A lubricant is applied to the surface of the protective film. As the lubricant, for example, a perfluoropolyether, fluorinated alcohol, fluorinated carboxylic acid or the like may be used.

Now, the magnetic recording apparatus (HDD) will be described below. FIG. 6 is a perspective view of a magnetic recording apparatus in which the magnetic recording medium manufactured according to the present invention is installed.

As shown in FIG. 6, the magnetic recording apparatus 150 according to the embodiment is of a type using a rotary actuator. The patterned medium 1 is attached to the spindle 140, and is rotated in the direction of arrow A by a motor (not shown) that responds to control signals from a drive controller (not shown). The magnetic recording apparatus 150 may comprise a plurality of patterned media 1.

The head slider 130 configured to read from and write to the patterned medium 1 is attached to the tip of the film-like suspension 154. The head slider 130 has a magnetic head mounted near the tip thereof. When the patterned medium 1 rotates, the air bearing surface (ABS) of the head slider 130 is held at a predetermined height so as to fly over the surface of the magnetic disk 200 under a balance of pressing force of the suspension 154 and the pressure produce on the air bearing surface (ABS) of head slider 130.

The suspension 154 is connected to one end of an actuator arm 155. A voice coil motor 156, a kind of linear motor, is provided on the other end of the actuator arm 155. The voice coil motor 156 is formed of a magnetic circuit including a driving coil (not shown) wound around a bobbin and a permanent magnet and a counter yoke arranged opposite to each other so as to sandwich the coil therebetween. The actuator arm 155 is held by ball bearings (not shown) provided at two vertical positions of the pivot 157. The actuator arm 155 can be rotatably slid by the voice coil motor 156. As a result, the magnetic head can be accessed any position on the patterned medium 1.

EXAMPLES

Example 1

A DTR medium was manufactured by the method as shown in FIGS. 3A-3I.

As shown in FIG. 3A, successively deposited on a glass substrate 51 were: a soft magnetic layer (CoZrNb) with a thickness of 40 nm, an underlayer for orientation control (Ru) with a thickness of 20 nm and a ferromagnetic recording layer (CoCrPt—$SiO_2$) with a thickness of 20 nm as a magnetic recording layer; a carbon hard mask (C) with a thickness of 25 nm as a first hard mask 53; and Cu with a thickness of 3 nm as a second hard mask 54. To the resultant layers, a photosensitive resin was applied by means of spin-coating to have a thickness of 50 nm as resist 55.

Secondly, as shown in FIG. 3B, imprinting was performed by use of a stamper 60 for imprinting on which the servo patterns and the patterns of the recording tracks as shown in FIG. 1 were formed.

Next, as shown in FIG. 3C, residues of the resist 55 remaining in the recesses was removed by use of ICP (Inductively Coupled Plasma) etching system which used $O_2$ gas. The residues of the resist 55 were removed with a chamber pressure set to 0.1 Pa, an RF power of a coil and an RF power of a platen set to 100 W and 50 W, respectively, and an etching time set to 15 seconds, so that the surface of the second hard mask 54 was exposed in the recesses.

Then, as shown in FIG. 3D, the second hard mask 54 was etched so that the first hard mask 53 was exposed. By use of an ECR (electron cyclotron resonance) ion gun, the etching was performed for 10 seconds under the conditions of using Ar as a process gas, microwave power of 500 W, and acceleration voltage of 600 V so that the entire 3 nm of Cu was etched.

Then, as shown in FIG. 3E, the first hard mask 53 was etched to form the patterns. The first hard mask 53 composed of carbon was etched by use of an RIE system which used $O_2$ gas, and under the conditions of gas pressure of 0.1 Pa, RF power of coil set to 100 W, RF power of a platen set to 50 W and processing time of 30 seconds. At the same time, the resist 55 remaining on the protrusions of the second hard mask 54 was removed.

After that, as shown in FIG. 3F, the second hard mask 54 was removed. This step was performed by using Ar as a process gas, with a microwave power of 500 W, an acceleration voltage of 600 V, and an etching time of 20 seconds to strip off the Cu entirely.

Then as shown in FIG. 3G, the deactivation was performed. By use of a deactivating gas, the crystal was changed to amorphous phase in order to eliminate the magnetism of the magnetic recording layer 52 in the recesses. This step was performed by gas exposure of 30 seconds, using an ECR ion gun which used a mixture gas of He and $N_2$ at a flow-ratio of 3:1, and under the conditions of gas pressure of 0.02 Pa, microwave power of 1000 W and acceleration voltage of 1000 V.

After that, as shown in FIG. 3H, the first hard mask 53 was removed. This step was performed by use of an ICP etching system using $O_2$ gas and under the conditions of chamber pressure of 1.5 Pa, RF power of a coil set to 400 W, RF power of a platen set to 0 W and processing time of 20 seconds.

As the last step, as shown in FIG. 3I, a protective film was formed. By means of CVD (chemical vapor deposition), a carbon protective film was deposited on the surface. A lubricant was applied thereto to provide a DTR medium of the present invention.

The DTR medium obtained by the steps above was mounted on a glide tester, to be subjected to a glide test by an AE (acoustic emission) method. As a result, the medium passed the test for a head flying height of 10 nm to show a very good property as a DTR medium.

Example 2

A DTR medium was manufactured in the same manner as in Example 1 except that some modifications were made in the steps of FIGS. 3A, 3D and 3F.

In the step of FIG. 3A, Si was used as the second hard mask 54. The thickness thereof was set to 3 nm. In the step of FIG. 3D, RIE using $CF_4$ gas was used for the etching of the second hard mask 54. The conditions of the etching were set to RF power of a coil of 100 W, RF power of a platen of 50 W and etching time of 10 seconds. In the step of FIG. 3F, $CF_4$ gas was used for the removal of the second hard mask 54. The conditions were set to RF power of a coil of 400 W, RF power of a platen of 0 W and an etching time of 30 seconds.

In this Example, due to the use of $CF_4$ gas in the removal of the second hard mask 54, it is not always necessary to etch the magnetic recording layer 52 by use of the first hard mask 53 as a mask as shown in FIG. 3F. In other words, as shown in FIG. 4A, the magnetic recording layer 52 may be in a condition that has no recesses at the stage where the removal of the second hard mask 54 is finished. In this case, the magnetic recording layer 52 may be in a condition that has no recesses, also in the subsequent steps (FIGS. 4B to 4D).

When the resultant DTR medium was subjected to the glide test as in Example 1, the medium passed the test for a head flying height of 10 nm to show a very good property as a DTR medium.

Example 3

A DTR medium was manufactured according to the method shown in FIGS. 5A-5J.

As shown in FIG. 5A, successively deposited on the glass substrate 51 were: a soft magnetic layer (CoZrNb) with a thickness of 40 nm, an underlayer for orientation control (Ru) with a thickness of 20 nm and a ferromagnetic recording layer (CoCrPt—$SiO_2$) with a thickness of 20 nm as the magnetic recording layer 52; carbon (C) with a thickness of 25 nm as the first hard mask 53; and Cu with a thickness of 3 nm as the second hard mask 54. To the resultant layers, a photosensitive resin was applied by spin-coating to have a thickness of 50 nm as the resist 55.

Secondly, as shown in FIG. 5B, imprinting was performed by use of the stamper 60 for imprinting on which the servo patterns and the patterns of the recording tracks as shown in FIG. 1 were formed.

Next, as shown in FIG. 5C, the residues of the resist 55 remaining in the recesses was removed by use of the ICP (Inductively Coupled Plasma) etching system which used $O_2$ gas. The residues of the resist 55 were removed with chamber pressure set to 0.1 Pa, RF power of a coil and RF power of a platen set to 100 W and 50 W, respectively, and etching time set to 15 seconds, so that the surface of the second hard mask 54 was exposed in the recesses.

Then, as shown in FIG. 5D, the second hard mask 54 was etched so that the first hard mask 53 was exposed. By use of an ECR (electron cyclotron resonance) ion gun, the etching was performed for 10 seconds under the conditions of using Ar as a process gas, microwave power of 500 W, and acceleration voltage of 600 V so that a part of Cu of 3 nm thickness was etched over the entire thickness.

Then, as shown in FIG. 5E, the first hard mask 53 was etched to form the patterns. The first hard mask 53 made of carbon was etched by use of RIE system which used $O_2$ gas, under the conditions of gas pressure of 0.1 Pa, RF power of a coil set to 100 W, RF power of a platen set to 50 W and processing time of 30 seconds. At the same time, the resist 55 remaining on the protrusions of the second hard mask 54 was removed.

After that, as shown in FIG. 5F, the second hard mask 54 was removed. This step was performed by 20 seconds of etching using Ar as a process gas, with microwave power of 500 W, and acceleration voltage of 600 V to strip off the entire Cu.

Figure 5G:
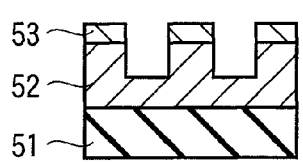

Then, as shown in FIG. 5G, a part of the magnetic recording layer 52 was etched by using the first hard mask 53 as a mask. Under the same conditions as in FIG. 3F which showed the removal of the second hard mask 54, the etching was performed until the depth of the groove reached 12 nm.

Figure 5H:
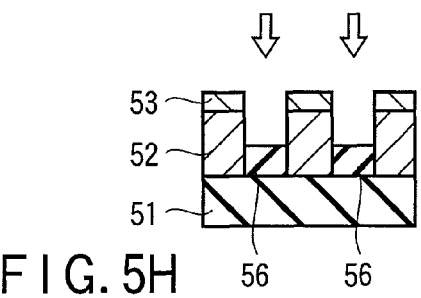

Then, the deactivation was performed as shown in FIG. 5H. By use of a deactivating gas, the crystal was changed to amorphous phase in order to eliminate the magnetism of the magnetic recording layer 52 in the recesses. This step was performed by gas exposure of 200 seconds using an RIE system which uses $CF_4$ gas, under the conditions of RF power of a coil set to 400 W and RF power of a platen set to 0 W.

Figure 5I:
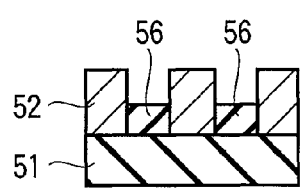

After that, as shown in FIG. 5I, the first hard mask 53 was removed. This step was performed by use of an ICP etching system which used O₂ gas and under the conditions of chamber pressure of 1.5 Pa, RF power of a coil set to 400 W, RF power of a platen set to 0 W and processing time of 20 seconds.

Figure 5J:
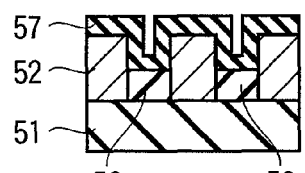

As the last step, as shown in FIG. 5J, a protective film was formed. By means of CVD (chemical vapor deposition), a carbon protective film was deposited on the surface. Then, a lubricant was applied thereto to provide a DTR medium of the present invention.

The DTR medium obtained by the steps described above was mounted on the glide tester to be subjected to the glide test by an AE (acoustic emission) method. As a result, the medium passed the test for a head flying height of 10 nm to show a very good property as a DTR medium.

Example 4

A DTR medium was manufactured in the same manner as in Example 1 except that some modifications were made in the steps of FIGS. 5A, 5D and 5F.

In the step of FIG. 5A, Si was used as the second hard mask 54. The thickness thereof was set to 3 nm. In the step of FIG. 5D, RIE using CF₄ gas was used for the etching of the second hard mask 54. The conditions of the etching were set to RF power of a coil of 100 W, RF power of a platen of 50 W and an etching time of 10 seconds. In the step of FIG. 5F, CF₄ gas was used for the removal of the second hard mask 54. The conditions were set to RF power of a coil of 400 W, RF power of a platen of 0 W and an etching time of 30 seconds.

When the resultant DTR medium was subjected to the glide test as in Example 1, the medium passed the test for a head flying height of 10 nm to show a very good property as a DTR medium.

Example 5

A bit patterned medium (BPM) was manufactured according to the method shown in FIGS. 3A-3I.

As shown in FIG. 3A, successively deposited on the glass substrate 51 were: a soft magnetic layer (CoZrNb) with a thickness of 40 nm, an underlayer for orientation control (Ru) with a thickness of 10 nm and a ferromagnetic recording layer (CoCrPt) with a thickness of 20 nm as a magnetic recording layer; carbon (C) with a thickness of 25 nm as the first hard mask 53; and Cu with a thickness of 3 nm as the second hard mask 54. To the obtained layers, a photosensitive resin was applied by spin-coating to have a thickness of 50 nm as the resist 55.

Secondly, as shown in FIG. 3B, imprinting was performed by use of the stamper 60 for imprinting on which the servo patterns and the recording bit patterns as shown in FIG. 2 were formed.

Next, as shown in FIG. 3C, the residues of the resist 55 remaining in the recesses were removed by use of ICP (Inductively Coupled Plasma) etching system which used O₂ gas. The residues of the resist 55 were removed by 15 seconds of etching with chamber pressure set to 0.1 Pa, RF power of a coil and an RF power of a platen set to 100 W and 50 W, respectively, to expose the surface of the second hard mask 54 in the recesses.

Then, as shown in FIG. 3D, the second hard mask 54 was etched so that the first hard mask 53 was exposed. By use of an ECR (electron cyclotron resonance) ion gun, the etching was performed for 10 seconds under the conditions of using Ar as a process gas, microwave power of 500 W, and acceleration voltage of 600 V so that a part Cu of 3 nm thickness was etched over the entire thickness.

Then, as shown in FIG. 3E, the first hard mask 53 was etched to form the patterns. The first hard mask 53 made of carbon was etched by use of RIE system which used O₂ gas, and under the conditions of gas pressure of 0.1 Pa, RF power of coil set to 100 W, RF power of a platen set to 50 W and processing time of 30 seconds. At the same time, the resist 55 remaining on the protrusions of the second hard mask 54 was removed.

After that, as shown in FIG. 3F, the second hard mask 54 was removed. This step was performed by using Ar as a process gas, with a microwave power of 500 W, an acceleration voltage of 600 V, and an etching time of 20 seconds to strip off the Cu entirely.

Then as shown in FIG. 3G, the deactivation was performed. By use of a deactivating gas, the crystal was changed to amorphous phase in order to eliminate the magnetism of the magnetic recording layer 52 in the recesses. This step was performed by gas exposure of 30 seconds, using an ECR ion gun which used a mixture gas of He and N₂ at a flow-ratio of 3:1, and under the conditions of gas pressure of 0.02 Pa, microwave power of 1000 W and acceleration voltage of 1000 V.

After that, as shown in FIG. 3H, the first hard mask 53 was removed. This step was performed by use of an ICP etching system using O₂ gas and under the conditions of chamber pressure of 1.5 Pa, RF power of a coil set to 400 W, RF power of a platen set to 0 W and processing time of 20 seconds.

As the last step, as shown in FIG. 3I, a protective film was formed. By means of CVD (chemical vapor deposition), a carbon protective film was deposited on the surface. A lubricant was applied thereto to provide a DTR medium of the present invention.

The DTR medium obtained by the steps described above was mounted on the glide tester, to be subjected to the glide test by an AE (acoustic emission) method. As a result, the medium passed the test for a head flying height of 10 nm to show a very good property as a BPM medium.

Example 6

DTR media were manufactured by using each method shown in Example 1 and Example 3, except that Ag, Au, Co, Cr, Ni, Pd and Pt were used instead of Cu for the second hard mask 54. The resultant DTR media were subjected to the glide test. As a result, all of the media passed the test for a head flying height of 10 nm to show very good properties as DTR media.

Example 7

DTR media were manufactured by using each method shown in Example 2 and Example 4, except that Al, Ta and Ti were used instead of Si for the second hard mask 54. The resultant DTR media were subjected to the glide test. As a result, all of the media passed the test for a head flying height of 10 nm to show very good properties as DTR media.

Comparable Example 1

A DTR medium was manufactured in the same manner as in Example 1, except that the step of removing the second hard mask (FIG. 3F) was omitted, and that some modifications were made in the conditions of the step of removing the first hard mask (FIG. 3H).

As a result of the omission of the removal of the second hard mask, the second hard mask 54 was etched and disappeared in the subsequent step of deactivation (FIG. 3G). The step of removing the first hard mask was performed by use of an ICP etching system which used $O_2$ gas, and under the conditions of chamber pressure of 1.5 Pa, RF power of a coil set to 400 W, RF power of a platen set to 0 W and processing time of 30 seconds.

As in Example 1, the glide test was conducted on the resultant DTR medium. As a result, although the medium passed the test for a head flying height of 15 nm, it did not pass the test for a head flying height of 10 nm. In other words, it was found that the resultant medium was inferior in performance as a DTR medium compared to the medium obtained in the Examples.

Comparable Example 2

A DTR medium was manufactured in the same manner as in Example 2, except that the step of removing the second hard mask (FIG. 3F) was omitted and that some modifications were made in the conditions of the step of removing the first hard mask (FIG. 3H).

As a result of the omission of the removal of the second hard mask, the second hard mask 54 was etched and disappeared in the subsequent step of deactivation (FIG. 3G). The step of removing the first hard mask was performed by use of an ICP etching system which used $O_2$ gas, and under the conditions of chamber pressure of 1.5 Pa, RF power of a coil set to 400 W, RF power of a platen set to 0 W and processing time of 30 seconds.

As in Example 2, the glide test was performed on the resultant DTR medium. As a result, although the medium passed the test for a head flying height of 15 nm, it did not pass the test for a head flying height of 10 nm. In other words, it was found that the resultant medium was inferior in performance as a DTR medium compared to the medium obtained in the Examples.

Comparable Example 3

A DTR medium was manufactured in the same manner as in Example 3, except that the step of removing the second hard mask (FIG. 5F) was omitted and that some modifications were made in the conditions of the step of removing the first hard mask (FIG. 5I).

As a result of the omission of the removal of the second hard mask, the second hard mask 54 was etched and disappeared in the subsequent step of deactivation (FIG. 5G). The step of removing the first hard mask was performed by use of an ICP etching system which used $O_2$ gas, and under the conditions of chamber pressure of 1.5 Pa, RF power of a coil set to 400 W, RF power of a platen set to 0 W and processing time of 30 seconds.

As in Example 3, the glide test was performed on the resultant DTR medium. As a result, although the medium passed the test for a head flying height of 15 nm, it did not pass the test for a head flying height of 10 nm. In other words, it was found that the resultant medium was inferior in performance as DTR medium compared to the medium obtained in the Examples.

Comparable Example 4

A DTR medium was manufactured in the same manner as in Example 4, except that the step of removing the second hard mask (FIG. 5F) was omitted and that some modifications were made in the conditions of the step of removing the first hard mask (FIG. 5I).

As a result of the omission of the removal of the second hard mask, the second hard mask 54 was etched and disappeared in the subsequent step of deactivation (FIG. 5G). The step of removing the first hard mask was performed by use of an ICP etching system which used $O_2$ gas, and under the conditions of chamber pressure of 1.5 Pa, RF power of a coil set to 400 W, RF power of a platen set to 0 W and processing time of 30 seconds.

As in Example 4, the glide test was performed on the resultant DTR medium. As a result, although the medium passed the test for a head flying height of 15 nm, it did not pass the test for a head flying height of 10 nm. In other words, it was found that the resultant medium was inferior in performance as DTR medium compared to the medium obtained in the Examples.

From the results of Examples 1 to 7 and Comparable Examples 1 to 4, it was found that by performing the step of removing the second hard mask 54, a medium is improved in surface properties and in glide performance.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of manufacturing a magnetic recording medium, comprising:
    forming a first hard mask, a second hard mask comprising an element selected from the group consisting of Aluminum (Al), Silicon (Si), Tantalum (Ta), Titanium (Ti), Silver (Ag), Gold (Au), Cobalt (Co), Chromium (Cr), Copper (Cu), Nickel (Ni), Palladium (Pd) and Platinum (Pt), and a resist on a magnetic recording layer;
    imprinting a stamper to the resist to transfer patterns of protrusions and recesses to the resist;
    removing residues in the recesses of the patterned resist;
    etching the second hard mask by using the patterned resist as a mask to transfer the patterns of protrusions and recesses to the second hard mask;
    etching the first hard mask by using the second hard mask as a mask to transfer the patterns of protrusions and recesses to the first hard mask;
    removing the second hard mask remaining on the protrusions of the first hard mask; and
    deactivating the magnetic recording layer exposed in the recesses by an ion beam irradiation using a gas mixture of Helium (He) and Nitrogen ($N_2$), or a gas of Tetrafluoromethane ($CF_4$).

2. The method of claim 1, wherein the second hard mask comprises an element selected from the group consisting of Ag, Au, Co, Cr, Cu, Ni, Pd and Pt, and removing the second hard mask comprises an ion beam etching using a noble gas comprising Neon (Ne), Argon (Ar), Krypton (Kr) or Xenon (Xe), or a gas comprising Oxygen ($O_2$) or $N_2$.

3. The method of claim 1, further comprising etching a part of the magnetic recording layer by using the first hard mask as a mask, prior to deactivating the magnetic recording layer.

4. The method of claim 1, wherein the first hard mask has a thickness of 4 nm to 50 nm.

5. The method of claim 1, further comprising forming an antioxidant layer between the magnetic recording layer and the first hard mask.

6. The method of claim 1, wherein the second hard mask has a thickness of 1 nm to 15 nm.

7. The method of claim 1, wherein the second hard mask comprises an element selected from the group consisting of Al, Si, Ta and Ti, and removing the second hard mask comprises reactive etching using a gas comprising fluorine.

8. The method of claim 7, wherein the gas comprising fluorine is $CF_4$.

9. The method of claim 1, wherein the first hard mask comprises carbon as a main component.

10. The method of claim 9, wherein the first hard mask comprises at least about 75% of carbon in terms of atom number ratio.

11. The method of claim 1, further comprising removing a reactant product of fluorine and Co contained in the magnetic recording layer after deactivating the magnetic recording layer using $CF_4$.

12. The method of claim 11, wherein removing the reactant product is performed by water washing or irradiation of water vapor plasma or Hydrogen ($H_2$) plasma.

* * * * *